Feb. 10, 1942.    J. W. TATTER ET AL    2,272,962
WHEEL CONSTRUCTION
Filed July 3, 1940    3 Sheets-Sheet 1

INVENTOR
John W. Tatter
AND
Byron H. Shinn
Ely & Frye
ATTORNEY

Feb. 10, 1942. J. W. TATTER ET AL 2,272,962
WHEEL CONSTRUCTION
Filed July 3, 1940 3 Sheets-Sheet 2

INVENTOR
John W. Tatter
AND
Byron H. Shinn
Ely & Frye
ATTORNEYS

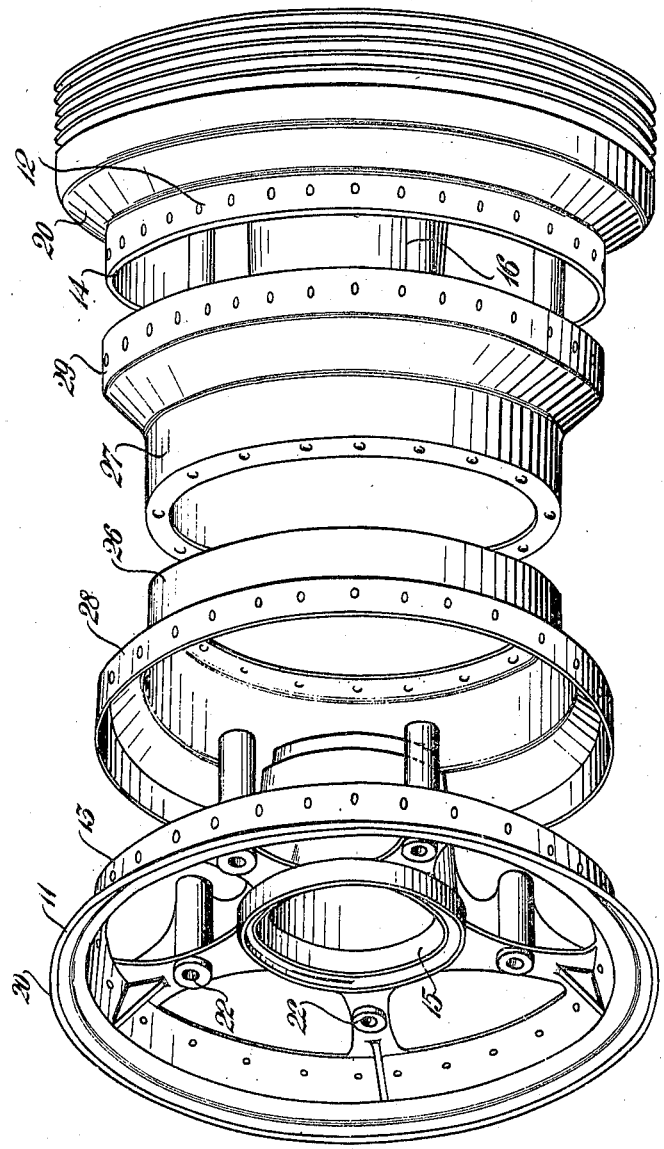

Patented Feb. 10, 1942

2,272,962

UNITED STATES PATENT OFFICE 2,272,962

WHEEL CONSTRUCTION

John W. Tatter, Akron, Ohio, and Byron Henry Shinn, Butler, Pa., assignors to The Firestone Tire & Rubber Company, Akron, Ohio, a corporation of Ohio Application July 3, 1940, Serial No. 343,700

3 Claims. (Cl. 301—63)

This invention relates to wheel constructions, especially to wheels used in airplanes and similar places where a minimum weight wheel is required.

The general object of the invention is to provide an improved wheel construction which is light in weight, but which is sturdily constructed, and adapted to receive side thrusts.

Another object of the present invention is to provide an easily constructed and assembled airplane wheel.

A further object of the invention is to provide a small diameter wheel on which a pneumatic tire and tube are readily mounted.

The foregoing and other objects will be manifest from the following specification, which is described with particular reference to the accompanying drawings, in which:

Figure 1 is an elevation of a wheel embodying the invention;

Figures 2 and 3 are elevations on lines 2—2 and 3—3 of Figure 1;

Figure 5 is a perspective view of the wheel of Figure 1 with the parts of the wheel spread out to show the manner in which they are assembled.

Figure 1:
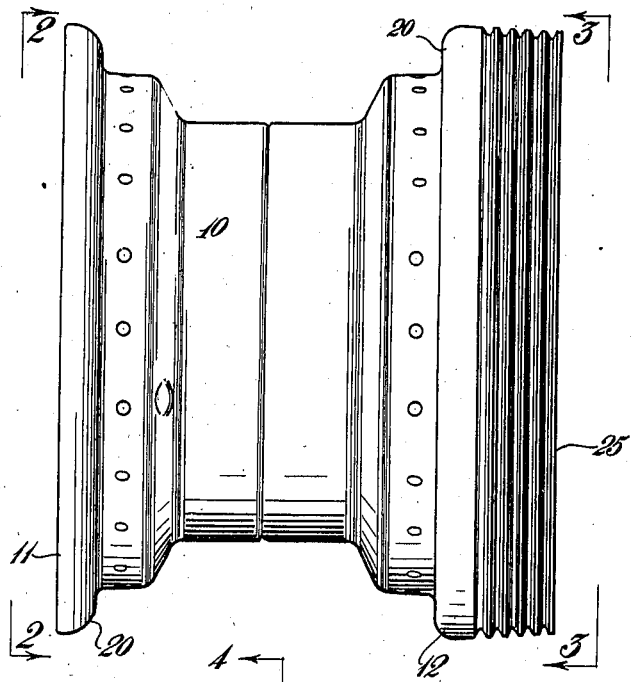
Figure 2:
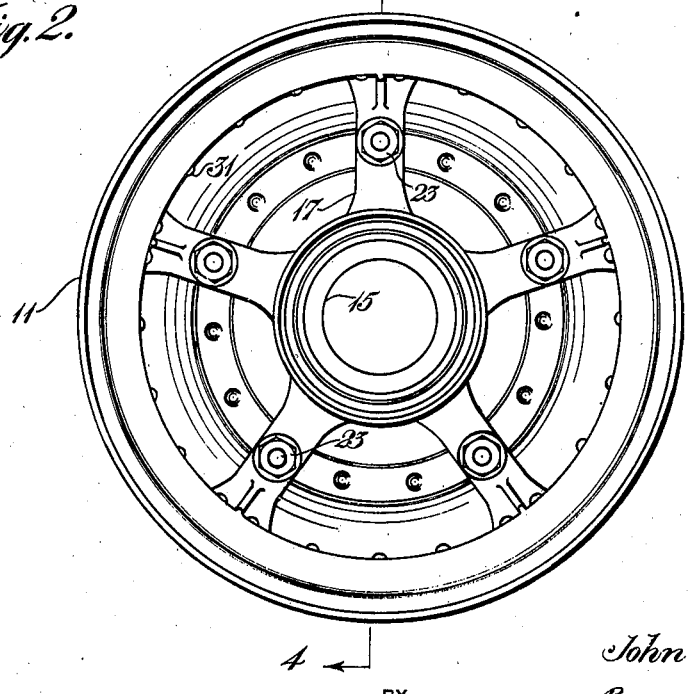
Figure 3:
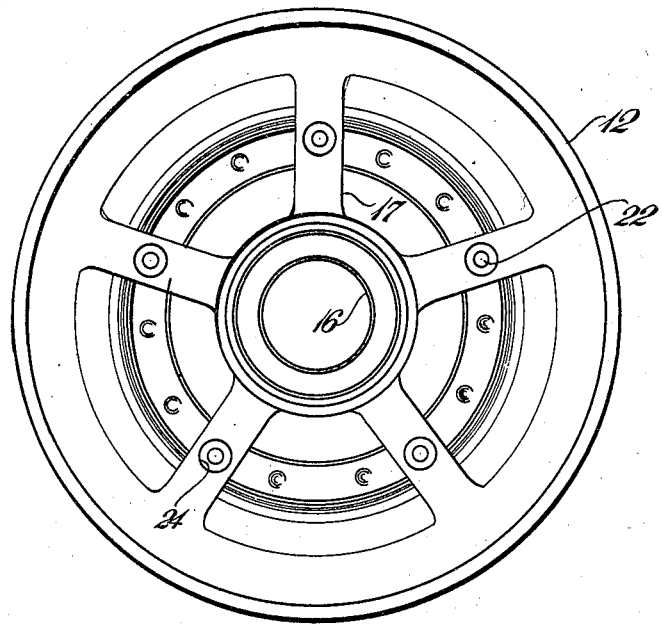

Referring in detail to the wheel 10 shown in Figure 1, it comprises two spoked wheel sections 11 and 12, which usually are cast from any suitable metallic material, and which are adapted to be mated or joined together to form a wheel. These wheel sections include narrow rim engaging flanges 13 and 14, respectively, formed integrally therewith at the axial outer portion thereof. The wheel sections have hubs 15 and 16, respectively, formed thereon, which extend inwardly of the wheel sections relative to the narrow flanges thereof. Spokes 17 formed in the wheel sections also have inwardly extending portions formed thereon which are adapted to be abutted when the wheel sections 11 and 12 are assembled to form a wheel so that the wheel is well adapted to withstand transversely directed forces applied thereto. Recesses 18 may be formed on the axial inner faces of the spokes 17 to reduce the volume of metal forming same. Recessed portions 21 are formed in the radially outer portions of the spokes 17 so that a drop center or well is formed in the wheel 10 when the wheel sections are assembled.

The spokes 17 have aligned apertures 22 formed therein and bolts 23 extend through these aligned apertures 23 to secure the wheel sections 11 and 12 together. Recesses 24 are formed in the wheel section 12 to receive the bolt heads so that the outer surface of the wheel section 12 is planar.

Each of the wheel sections 11 and 12 has an outwardly extending flange 20 formed at its outer edge, which flange is adapted to engage with and retain the bead of a pneumatic tire, carried on the wheel 10, whereby the tire is held upon the wheel. The wheel section 12 is the inner section of the wheel, and it has a brake drum 25 formed on the periphery of its inner edge.

Figure 4:
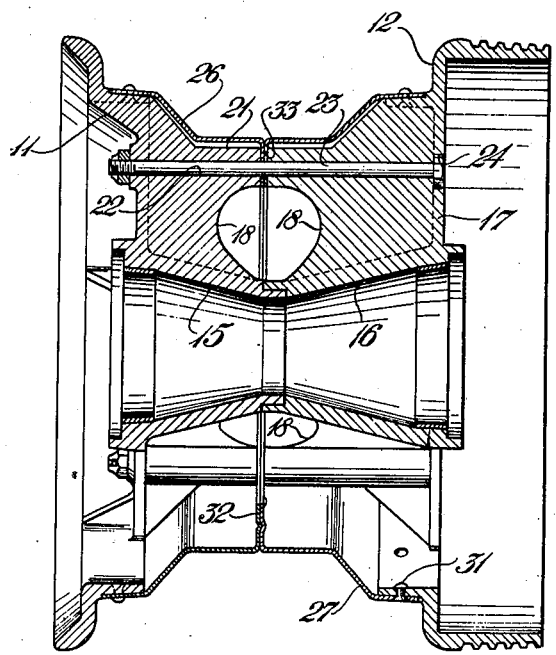
Figure 4 is a vertical sectional elevation on line 4—4 of Figure 2.

To form a tire and tube receiving portion on the wheel 10, annular, split rim sections 26 and 27 are associated with the wheel sections 11 and 12. These rim sections are formed from a thin metal sheet by spinning or otherwise forming the metal sheet to the desired shape and have outer edge portions 28 and 29, respectively, that are adapted to engage with the flanges 13 and 14. Rivets 31 may extend through the rim sections 26 and 27 and the wheel sections 11 and 12 to secure same together. The rim sections have portions of reduced diameter, as shown in Figure 4, which correspond to the contour of the upper ends of the spokes 17, to form a center well in the wheel 10. Radially inwardly extending flanges 32 are formed on the inner edges of the rim sections 26 and 27, and these flanges are abutted when the wheel sections 11 and 12 are assembled. Preferably the bolts 23 extend through apertures 33 formed in the flanges 32 to aid in retaining the rim sections in position.

Figure 5 clearly shows that a minimum of metal is required to form the wheel 10. This is due to the spoked construction of the wheel sections, together with the use of thin walled rims. The spokes of the wheel sections, by being abutted in the assembled wheel, adapt the wheel to withstand relatively large side thrust forces applied to the wheel. Then too, the spokes, flange and rim all are sturdy, whereby radially directed forces applied to the wheel are carried by the wheel without damage thereto. The rim sections 26 and 27 form a continuous base member adapted to engage and position the inner tube of a pneumatic tire carried on the wheel.

The wheel construction of the invention is particularly suited for use in mounting airplane tires having a small inner diameter wherein the bead and wheel diameters make it difficult to spring the tire onto a drop-center wheel. The present split-wheel construction permits the tire and tube to be mounted without springing them over the tire retaining flanges of the wheel.

From the foregoing, it will be seen that a light-weight but sturdy wheel is provided by the invention, and that the objects of the invention have been realized.

While an embodiment of the invention has been completely illustrated and described herein, it will be appreciated that various modifications may be made without departing from the scope of the invention as defined in the appended claims.

What is claimed is:

1. A split wheel for a pneumatic tire comprising two spoked wheel sections adapted to be positioned together to form a wheel, said wheel sections having narrow flanges thereon at their radially outer edges and hubs that extend axially inwardly of the outer edges of said wheel sections appreciably farther than said flanges, the spokes of said wheel sections extending axially inwardly of said wheel sections substantially as far as said hub, means extending through the outer edges of said wheel sections to secure them together with the inner ends of said hubs and spokes abutted against each other, two annular rim sections adapted to engage with said flanges and form a tire receiving center in the wheel, and means for securing said rim sections to said wheel sections.

2. A split wheel for a pneumatic tire comprising two spoked wheel sections, having hubs and flanges thereon, adapted to be positioned together to form a wheel, removable means extending through said wheel sections to secure them together with the inner ends of said hubs and spokes abutted against each other, two thin walled annular metal rim sections adapted to engage with said flanges and being provided with smaller diameter sections that extend inwardly of the wheel, and means for securing said rim sections to said wheel sections whereby said rim sections form a tire receiving center well of the wheel.

3. A split wheel for a pneumatic tire comprising two spoked wheel sections adapted to be positioned together to form a wheel, each of said wheel sections having a narrow flange thereon at its outer edge and a hub that extends inwardly of the outer edge of said wheel section appreciably farther than said flange, the spokes of said wheel sections extending axially inwardly of the outer edge of said wheel sections substantially as far as said hub, means extending through said wheel sections to secure them together to form a wheel, and annular rim sections adapted to engage with said fellies and form a tire receiving center well in the wheel.

JOHN W. TATTER.
BYRON H. SHINN.

CERTIFICATE OF CORRECTION.

Patent No. 2,272,962.  February 10, 1942.

JOHN W. TATTER, ET AL.

It is hereby certified that error appears in the printed specification of the above numbered patent requiring correction as follows: Page 2, first column, line 24, claim 1, strike out "the outer edges of" and insert the same after "inwardly of" in line 22, same claim; and second column, line 14, claim 2, for "of the" read --in the--; and that the said Letters Patent should be read with this correction therein that the same may conform to the record of the case in the Patent Office.

Signed and sealed this 9th day of June, A. D. 1942.

(Seal)

Henry Van Arsdale,
Acting Commissioner of Patents.